July 4, 1933.    D. A. LETTINI    1,917,133
CLUTCH
Filed Oct. 10, 1932

D. A. Lettini
Inventor

Raymond Jones.
Attorney

Patented July 4, 1933

1,917,133

UNITED STATES PATENT OFFICE

DONATO A. LETTINI, OF ELIZABETH, NEW JERSEY

CLUTCH

Application filed October 10, 1932. Serial No. 637,151.

My invention relates to clutches and more particularly to clutches of the free-wheeling type which are two way engaging in the direction to apply power to the driven load.

The main object of my invention is to provide a clutch which is substantially built into a driving gear or the like to form a unitary structure therewith.

Another object is to provide a clutch having a plurality of engaging faces which are positioned to apply the driving effort in the most efficient manner.

Another object is to provide a clutch which is sturdy in construction, economical to manufacture and maintain, and which is easy to assemble.

Other objects will become readily apparent from the detailed description which follows, taken with the accompanying drawing which shows a preferred form of my invention and wherein,—

Figure 1:
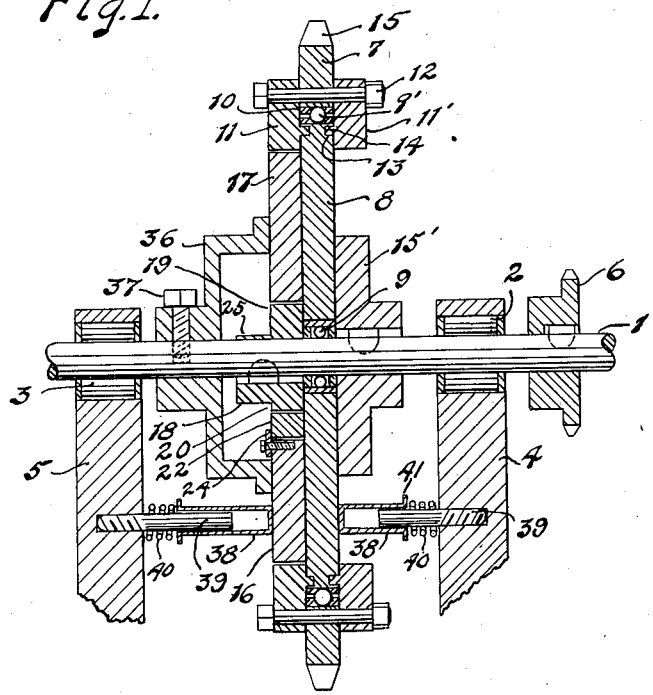
Figure 2:
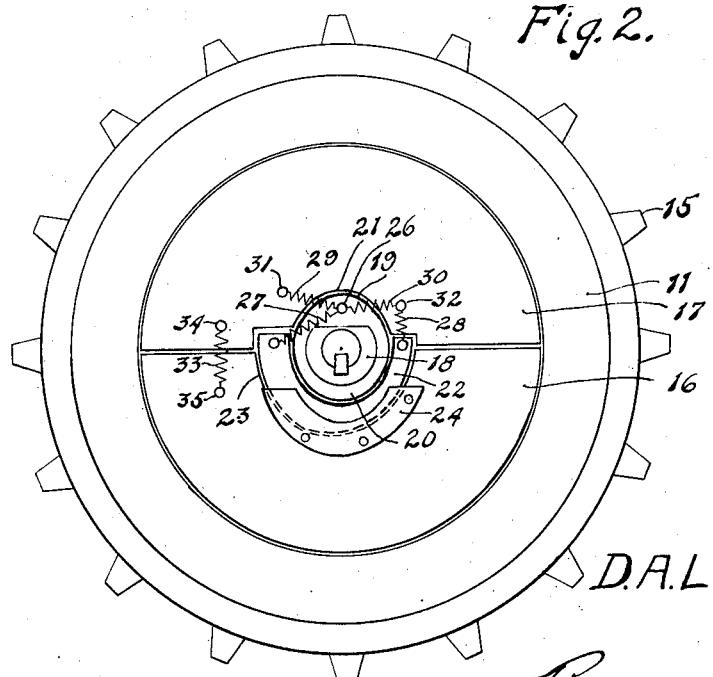

Figure 1 is a view in longitudinal section of an assembled clutch and driving sprocket; and Fig. 2 is a view in side elevation with parts removed to show details of the clutch.

Referring to the drawing in detail, a drive shaft 1 is supported to rotate in the roller bearings 2 and 3 mounted in pedestals 4 and 5. The shaft 1 may be rotated in any desired manner, for example, by a sprocket wheel 6 which is keyed thereto. I have provided a novel form of a free wheel device of the sprocket type which is formed in two main portions, the outer or toothed ring 7 and the inner web portion 8. The web 8 is supported to rotate on bearings 9 on the shaft 1, while the toothed ring 7 is carried on the web 8 by means of ball bearings 9' retained in a ball race 10. To retain the ring 7 on the web 8, a pair of plates 11, 11' are secured by bolts 12 to either side of the ring 7 to overlap the web 8. A pair of grooves 13 formed in the web 8 receive, respectively, a pair of ribs 14 formed on the inner faces of the plates 11 and 11'. The plate 11 may be formed preferably from brass since this plate is designed to cooperate through frictional contact with certain clutch shoes to be described. The ring 7 is provided with sprocket teeth 15.

A flange member 15' is keyed to shaft 1 and serves to prevent movement of the web 8 to the right in Figure 1. My improved clutch element comprises two main clutch plates 16 and 17 which are mounted to lie on opposite sides of the shaft and in face contact with the web 8. Each clutch plate, when forced outwardly radially will engage along its periphery with the inner edge face of the brass ring 11. A double cam member 18 is keyed to the shaft 1 and is provided with a pair of cams 19, 20, arranged on opposite sides of this member. For this purpose, the member 18 is formed slightly elliptical to provide a cam extension at each end of the major axis. The clutch plate 17 is cut out near its center to form a cam recess 21 corresponding in shape to that of the cam 19.

An arcuate floating cam member 22 is located in a cam shaped recess 23 formed at the center in the plate 16. A small clearance is allowed between the cam member 22 and the edge of recess 23. It will be noted that the cam member 22 is tapered to simulate a wedge. A retaining plate 24 secured to the plate 16 serves to retain the cam member 22 in position laterally.

The cam member 18 is cut away at 25 to provide clearance and a support for a spring retaining screw 26. A pair of cam retracting springs 27 and 28 are attached at one end to the free ends of the cam plate 22 and at their opposite ends respectively to the screws 26 and 32. A second pair of retracting springs 29 and 30 are attached at points 31 and 32 to the clutch plate 17. Another spring 33 is attached at 34 to the plate 17 and at 35 to the plate 16.

The springs 27 and 28 serve to return the cam plate 22 to its neutral position after its displacement. The springs 29 and 30 serve to return the plate 17 to its neutral or nonengaging position after its clutching engagement. The spring 33 acts to urge plates 16 and 17 towards each other and out of clutching engagement. A cover plate 36 is detachably retained by a set screw 37 and serves to cover the central clutch parts.

It will be noted that the plate 11 serves a double function of holding the ring 7 in position and engaging the clutch plates 16, 17, through frictional contact, thereby rotating the ring 7 through rotation of these plates. Driving thrust is applied to plate 11 through the large radius of plates 16, 17. The ribs 14 and grooves also serve a double function of assisting in retaining and guiding the ring 7 during its free movement over the plates 16, 17, and web 8 and, furthermore, when a thrust is imparted from a plate 16 or 17 directly on the plate 11, thereby tending to rock the ring 7 clockwise in Figure 1, the rib 14 on the left particularly will engage the upper face of its groove 13 and prevent any clockwise displacement.

I provide a pair of yielding drag or brake members 38 which are slidably mounted on pins 39 threaded into their respective supports 4, 5. Springs 40 which engage flanges 41 on the cap like members 38 act to thrust these members toward the web 8. The members 38 apply a braking action to plates 16 and 17 to prevent these plates from rotating with the ring 7 when the latter runs freely.

In the operation of the device, a load may be connected to the sprocket ring 7 through a sprocket chain not shown. Under certain conditions, this load may comprise moving parts driven by another source of power; hence, when the shaft 1 is not driven by the sprocket wheel 6, the sprocket ring 7 is free and may rotate idly on the web 8. When the sprocket wheel 6 is driven from a source of power at any speed higher than the speed of the ring 7, the speed of which sometimes may even be zero, the clutch elements become operative to apply power to the ring 7 from the shaft 1. A slight rotation of shaft 1 in either direction relative to the position of ring 7 will permit the cams 19 and 20 to force the clutch plates 16, 17 outwardly radially. The cam 19 will engage the plate 17 directly along the cam recess 21. The cam 20 will engage the cam plate 22 which may rock slightly around the shaft 1 and, at the same time, may be moved radially bodily to engage the plate 16 whereby to move the latter outwardly to engage the ring 11. When the speed of the shaft 1 decreases relative to that of the ring 7, the clutch will become disengaged. The function of the springs connected to the plates 16, 17 and 22 is to provide a quick release for the clutch elements and restore same to their original positions. The cam plate 22 provides a maximum of wearing face between the cam 20 and the plate 16. The plate 22 acts to compensate for wear on the clutch surfaces in that this plate will shift gradually counter-clockwise to maintain plate 16 spaced close to ring 11. The springs 27, 28 connected thereto will permit the plate 22 to float in neutral when not in its engaging position.

My clutch is designed in a manner to provide simplicity of parts and ease of assembly and replacement of parts. Its various elements are designed to provide a rugged construction and an efficient operation and its cost of manufacture is relatively low. In operation, the engagement of parts is smooth and positive.

While I have shown and described a preferred form of my invention for the purpose of an understanding of its principles, it is to be understood that various modifications are contemplated as will be included within the scope of the claims which follow.

What I claim is:

1. In a free wheel clutch, a driving shaft, a driven member, a cam surface disposed eccentrically on the shaft, an arcuate cam plate in engagement with said cam surface and movable in either direction around the shaft, spring members for yieldably retaining said cam plate in a neutral position in contact with the cam surface, a clutch member, said member being provided with a cam face in engagement with the cam plate, a clutch engaging surface on said driven member adjacent the outer end of the clutch member, said cam plate being movable radially by the cam surface whereby to move the clutch member to engage the clutch engaging surface upon relative movement between the driving shaft and driven member, a second cam surface disposed eccentrically on the shaft, a second clutch member having a cam face engaging said last named cam surface and being movable thereby to engage said clutch engaging surface to provide a two way engaging clutch.

2. In a free wheel clutch, a driving shaft, a circular plate mounted on said shaft and concentric therewith, a driven rim supported on the periphery of said circular plate, retaining plates projecting radially from said rim and extending to overlap peripheral side portions of said circular plate, a clutch member arranged in face contact with said circular plate and movable radially to engage one of said retaining plates, and cam means on said shaft arranged in position to move said clutch member radially upon relative motion between said rim and shaft.

3. In a device as set forth in claim 2, interengaging means on one of the retaining plates and the circular plate adapted to prevent relative radial displacement therebetween.

4. In a device as set forth in claim 2, one of the retaining plates being provided with an inner circular face in position to engage the clutch member, and an interengaging tongue and groove connection between said retaining plate and the circular plate.

5. In a device as set forth in claim 2, each retaining plate being provided with a laterally extending circular rib, a circular groove on each side of the circular plate for receiving said ribs and a series of anti-friction rollers positioned between the rim and the circular plate.

6. In a device as set forth in claim 2, wherein the circular plate is mounted to rotate on the shaft, and a housing plate is secured to the shaft and positioned to retain the clutch member adjacent the circular plate.

In testimony whereof, I affix my signature.

DONATO A. LETTINI.